April 12, 1966  A. W. SIMMONS ETAL  3,245,730
BRAKE VALVE DEVICE WITH MINIMUM APPLICATION INSURING FEATURE
Filed Aug. 21, 1963

INVENTORS
ARTHUR W. SIMMONS
JACK WASHBOURN
BY
ATTORNEY

United States Patent Office 3,245,730
Patented Apr. 12, 1966

3,245,730
BRAKE VALVE DEVICE WITH MINIMUM
APPLICATION INSURING FEATURE
Arthur W. Simmons and Jack Washbourn, King's Cross, London, England, assignors to Westinghouse Brake & Signal Company, Ltd., London, England
Filed Aug. 21, 1963, Ser. No. 303,614
Claims priority, application Great Britain, Nov. 5, 1962, 41,715/62
5 Claims. (Cl. 303—56)

This invention relates to driver's brake valves and, more particularly, to a brake valve device for use in a fluid pressure brake system on trains.

The present invention provides a driver's brake valve in which the handle can be moved a predetermined distance from release position without effecting operation of the spindle of the valve, the spindle being moved by spring means to the corresponding handle position upon the handle being moved more than the predetermined distance.

Preferably, the spindle includes a ratchet face engaged by a pivotally mounted pawl, the pawl having an abutment for engagement by the handle such that rotation of the handle exceeding the predetermined distance moves the pawl out of engagement with the ratchet face.

Conveniently, the spring means may be located in the handle and may comprise a leaf spring engaging a projection from the spindle and urging it into engagement with the handle.

One embodiment of the present invention will now be described in greater detail, by way of example only, with reference to the accompanying drawings of which:

Figure 1:
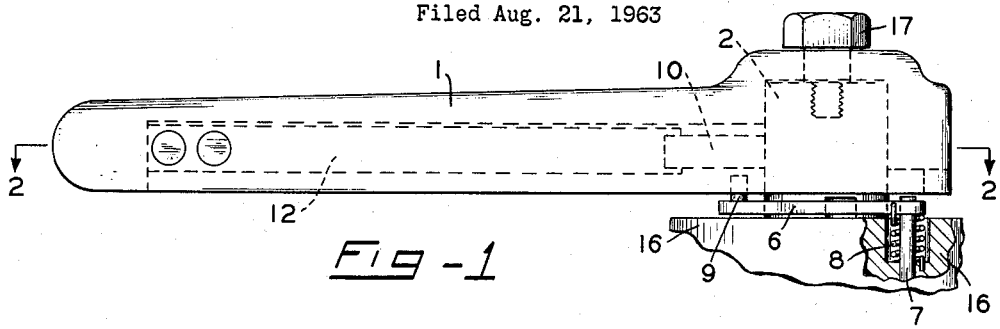
FIG. 1 shows a side view of the handle.
Figure 2:
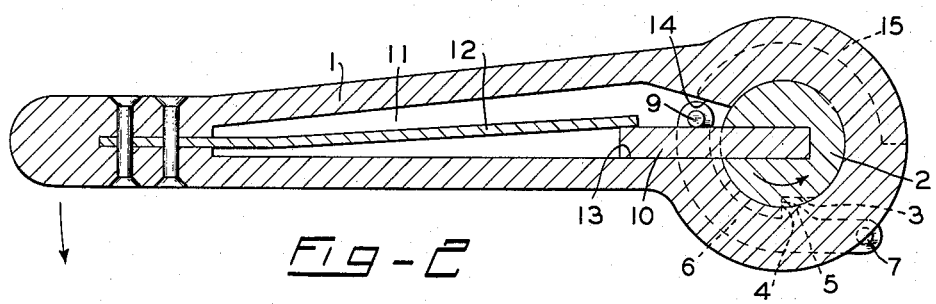
FIG. 2 shows a cross-sectional view on the line 2—2.
Figure 3:
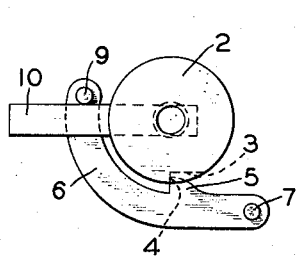
FIG. 3 is a plan view of the spindle and the pawl with the handle removed.
Figure 4:
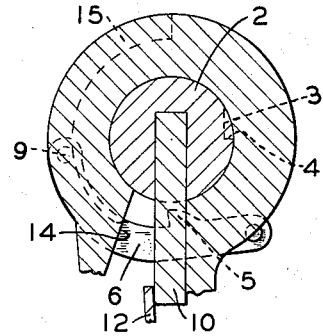
FIG. 4 is a part-sectional plan view with the handle turned through 90°.

As shown in the accompanying drawings, and with particular reference to FIG. 1, the handle 1 of a driver's brake valve is rotatably mounted on the spindle 2 of the valve, rotation of the spindle 2 operating the driver's brake valve in the well known manner. The handle 1 is mounted as aforesaid by means of a shouldered bolt 17. The spindle 2, as can be seen in FIGS. 2, 3 and 4, has an axially extending recess 3 providing a ratchet face 4. In the release position of the valve, the ratchet face 4 is engaged by a pawl 5 carried by a curved arm 6 pivotally mounted at one end on a fulcrum 7 mounted in the casing 16 of the valve and biased into engagement with the ratchet face 4 by means of a spring 8 (FIG. 1) encircling the fulcrum 7. At its other end, the curved arm 6 carries a pin 9.

Extending radially from the spindle 2 is an abutment 10.

The handle (as can be seen in FIG. 2) is hollow and secured within the cavity 11 in the handle is a leaf spring 12 which resiliently urges the abutment 10 into engagement with the wall 13 of the cavity 11 in the handle 1.

Another face 14 of the cavity 11 provides a cam surface, which upon counterclockwise rotation of the handle 1, is engaged by the pin 9 on the curved arm 6. A portion of the periphery of the end of the handle 1 encompassing the spindle 2 is undercut at 15 to an extent such that the pin 9 can pass under the undercut 15.

The operation of the above-described device is as follows:

With the handle of the valve in the release position (as shown, for example, in FIG. 2), to apply the brakes it is necessary to rotate the handle 1 in counterclockwise direction. Upon moving the handle 1 in this manner, initially the spindle 2 is not rotated, the spindle 2 being retained in its position by engagement of the pawl 5 with the ratchet face 4. During the first part of this initial movement, the leaf spring 12 will be deflected as the abutment 10 (which is rigid with the spindle 2) moves away from the face 13 of the cavity 11. As this initial movement continues, the pin 9 will move towards the cam face 14 of the cavity 11 until it finally engages it and thereafter the pin 9 will travel along the cam face 14 pivoting the curved arm 6 about the fulcrum 7. Meanwhile, of course, the leaf spring 12 will continue to be deflected by the abutment 10.

The stage will be reached at the end of this initial movement of the handle 1, at which the rotation of the curved arm 6 causes the pawl 5 to be moved out of engagement with the ratchet face 4. When this occurs, the spindle 2 will no longer be prevented from rotational movement and will be pivoted about its axis in a counterclockwise direction under the action of the leaf spring 12 until the abutment 10 engages the face 13 of the cavity 11 in the handle 1; that is to say, until the spindle 2 takes up an angular position corresponding to the angular position of the handle 1.

Thereafter, the spindle will continue to be moved with the handle to preserve their relative angular positions by the spring 12 retaining the abutment 10 in engagement with the face 13 of the cavity 11.

Further, at the completion of the initial movement of the handle, the pin 9 will have traveled across the cam face 14 of the cavity 11 until it is clear of that face and the action of spring 8 tending to move the curved arm in the opposite direction, causes the pin 9 to ride along the undercut 15 in the handle 1 as can be seen from FIG. 4.

When returning the handle to its original position by rotating it in a clockwise direction, the spindle 2 will be caused to rotate with the handle 1 by engagement of the face 13 in the cavity 11 with the abutment 10. During this clockwise rotation of the handle 1, the pin 9 on the curved arm 6 will initially travel back along the undercut 15 but as soon as the pin 9 is clear of the undercut 15, the pawl 4 which has been riding along the outside of the spindle 2 will prevent the curved arm pivoting back to its initial position under the influence of the spring 8. However, when the handle 1 returns to its starting position, the pawl 4 will then be aligned with the ratchet face 5 so that the arm 6 can, in fact, be pivoted under the influence of spring 8 to engage the pawl 5 with the ratchet face 4; that is to say, the handle will be in the position shown in FIG. 2 from which it started.

The advantage of such an arrangement is that it ensures that during a brake application at least a minimum amount of braking is applied whereas during the release this minimum limitation is removed.

Having now described the invention, what we claim as new and desire to secure by Letters Patent is:

1. A brake valve device comprising:
(a) a casing,
(b) a valve operating spindle rotatably mounted in said casing,
(c) abutment means connected to said spindle for movement therewith,
(d) latch means pivotally mounted on said casing for locking engagement with said spindle in one position of said latch means,
(e) said latch means movable into a second position for disconnecting said spindle therefrom and conditioning said spindle for movements,
(f) a lever member journaled on said spindle for rotation relative thereto,
(g) said lever member having cam means operatively connected to said latch means for moving said latch means into said second position upon predetermined movement of lever member, and (h) said lever member having spring means operatively connected to said abutment means for biasing said spindle into the same rotative position as said lever member.

2. A brake valve device for insuring a minimum appliation comprising:
(a) a casing,
(b) a valve operating spindle rotatably mounted in said casing,
(c) abutment means connected to said spindle for movement therewith,
(d) latch means pivotally mounted on said casing,
(e) said latch means in one position locking said spindle against rotation and in another position unlocking said spindle for rotation,
(f) a manually operable lever member journaled on said spindle for rotation relative thereto in a first direction and a second direction wherein said second direction is opposite in sense to said first direction of rotation,
(g) said lever member having a pair of spaced shoulders,
(h) said lever member having a spring biasing said abutment means into engagement with one of said spaced shoulders, and
(i) said lever member having a cam operative upon predetermined rotation of said lever member in said first direction to move said latch means to said other position.

3. A brake valve device comprising:
(a) a support member,
(b) a valve operating spindle rotatably mounted in said support member,
(c) an operating lever journaled on said spindle for rotary movement relative thereto,
(d) means providing a resilient driving connection between said lever and said spindle,
(e) means inhibiting rotary movement of said spindle out of a predetermined position in one direction, and
(f) means on said lever effective upon a predetermined rotary movement relative to said spindle while said spindle is in its predetermined position for rendering said inhibiting means ineffective to inhibit rotary movement of said spindle out of its predetermined position.

4. A brake valve device comprising:
(a) a support member,
(b) a valve operating spindle rotatably mounted in said support member,
(c) an operating lever journaled on said spindle for rotary movement relative thereto,
(d) means providing a resilient driving connection between said lever and said spindle,
(e) a member having one position in which it prevents rotary movement of said spindle in one direction out of a predetermined position and a second position in which it frees said spindle for rotary movement, and
(f) means on said lever cooperating with said member to effect operation thereof to its said second position upon a predetermined rotary movement of said lever relative to the spindle while said spindle is in its said predetermined position.

5. A brake valve device as claimed in claim 4 characterized in that when said member is operated to free the said spindle for rotary movement out of its said predetermined position, said resilient connection providing means effects instantaneous rotary movement of the said spindle to a position in correspondence with the position of said operating lever.

References Cited by the Examiner
UNITED STATES PATENTS 1,628,319  5/1927  Howe _____ 303—56
2,061,912  11/1936  Logan _____ 303—56 X EUGENE G. BOTZ, *Primary Examiner.*